May 5, 1959            A. HAÜG            2,884,869

RESILIENT COUPLINGS FOR TRAIN CARS

Filed Oct. 22, 1954            2 Sheets-Sheet 1

INVENTOR.
ALBERT HAUG
BY

May 5, 1959 A. HAUG 2,884,869
RESILIENT COUPLINGS FOR TRAIN CARS
Filed Oct. 22, 1954 2 Sheets-Sheet 2

INVENTOR.
ALBERT HAUG
BY

United States Patent Office 2,884,869
Patented May 5, 1959

2,884,869
RESILIENT COUPLINGS FOR TRAIN CARS
Albert Haug, Kaiserslautern, Germany, assignor to Franz Kruckenberg, Heidelberg, Germany
Application October 22, 1954, Serial No. 464,127
Claims priority, application Germany October 23, 1953
8 Claims. (Cl. 105—4)

This invention relates to coupling means for adjacent ends of two train car bodies.

It is an object of the present invention to provide means affording a very efficacious, resilient connection between each of two adjacent cars of a train and an intermediately located wheel carriage for such cars.

It is another object of the present invention to provide means facilitating a sturdy and effective coupling system employing a minimum number of parts to maintain the axle of the wheel carriage in a substantially central location relative to adjacent train cars at all times.

It is a further object of the present invention to provide means enabling the construction of a coupling system which takes up the load of adjacent train cars or members and limits undesirable and excessive swaying motion of said cars relative to the carriage, in particular when negotiating curves along tracks.

This invention more specifically concerns a system for resiliently supporting adjacent ends of two coupled car bodies of a train by means of an intermediately arranged axle frame. These axle frames or carriages which may have a single or more than one axle, must be movable in any direction and to a certain extent relative to the car bodies. Arrangements of single axle frames for a series of cars of trains heretofore known in which, when the train describes a curve, the axle is adjusted along the angular bisector of the angle between the longitudinal axes of adjacent cars by means of a link system, necessitated a plurality of devices for maintaining the axle carriages movable to a desired extent relative to the cars so as to transmit any required forces.

Thus in one known mode of execution there are required, besides the linkage system for orienting the axle carriage along the angular bisector above mentioned, an intermediate coupling between carriage and the cars, a spring system for supporting one car on the carriage and a pendulum system for connecting the other car to the brackets of the spring system, as well as spring couplings or dampers to limit the motion of the chain and a support for braking momentums. It is further known to support the ends of adjacent car bodies of a train on a single axle carriage, according to which the car ends are supported on the frame of the carriage and the adjustment of the axle carriage when the train describes a curve, is effected along the angular bisector through a linkage system which has oppositely directed link rods, the adjacent ends of said rods being connected to links mounted on the carriage frame, while the remote ends of said rods are connected to links mounted on the car bodies.

The present invention concerns a new system or construction for supporting the car ends on the intermediately positioned axle carriage, and has as a further object to provide means leading to a marked simplification and effectiveness of various coupling members or parts.

According to the invention, those parts of the linkage system connected to the cars, which are to be resiliently supported on a single axle carriage, are constructed as resilient elements for absorbing the load of the cars. It is, therefore, another important feature of the present invention to provide means envisaging a resilient support for the cars by means of links which remove the necessity of special resilient supports.

For example, the linkage between the cars and the link arms may be coupled by means of torsion springs or air springs, the horizontal axis of which is perpendicular to the longitudinal axis of the respective car. The links are therefore mounted on vertical bolts for oscillation about the spring axis in order not to impair the action of the links upon installation and adjustment of the carriage. To this end, there are provided between the cars and the axle carriage in both lateral directions transverse springs which permit limited transverse motion of the carriage relative to the cars.

When air springs are used to support the cars on the link rods the pressure of the air cushion is preferably related and adjustable to the load in the cars. To this end the air cushion means may be connected to a weight or load responsive regulating or control member which admits or releases compressed air from an air supply source in accordance with the load. Preferably the control member is so disposed and adjusted that when the train is in motion it becomes inactivated in order to prevent undesired loading.

Due to the resiliency of the mounting of the cars on the single axle carriage, there exists a greater susceptibility to swaying motion of the car bodies relative to the carriage. This amount of swaying is the greater the more the cars are rigidly connected against rotation or motion in sideward direction. When the train is moving along straight track stretches occasional lateral motion of the wheel flanges against the rails will result in small swaying motions while when the train passes through track curves, non-superelevated curves, or switches, dynamic swaying or swinging movements may be produced.

Limiting such swaying movements to an absolute minimum is necessary so that the swaying movements can be strongly damped to cause any oscillations to die out quickly. For this purpose the two lateral torsion springs on each car are coupled together for limited rotation.

These and other objects of the invention will become further apparent from the following detailed description, reference being made to the accompanying drawing, showing preferred embodiments of the invention.

Embodiments according to the invention are hereinafter explained in conjunction with the accompanying drawing in which.

Figure 1:
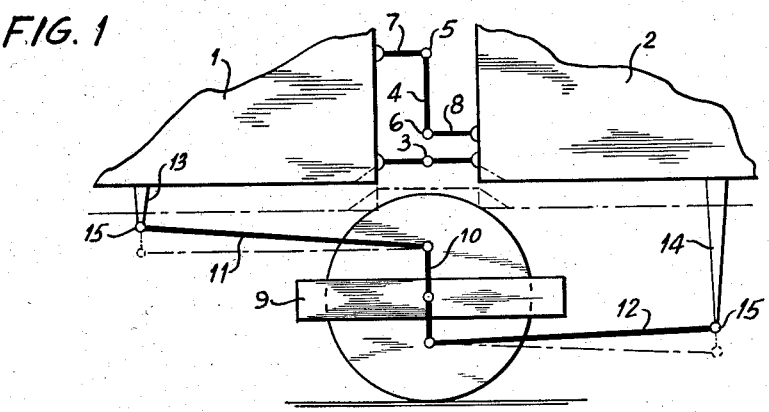
Fig. 1 shows schematically the coupling of two cars by means of a linkage control for a carriage with single axle.
Figure 2:
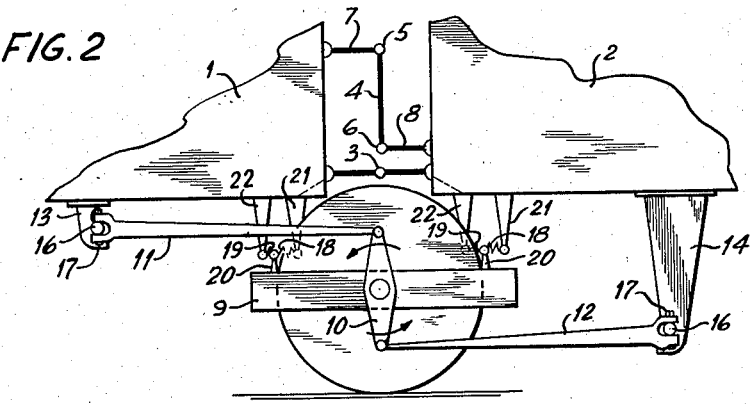
Fig. 2 shows a modified embodiment of the invention schematically illustrating link rods with torsion spring member.
Figure 3:
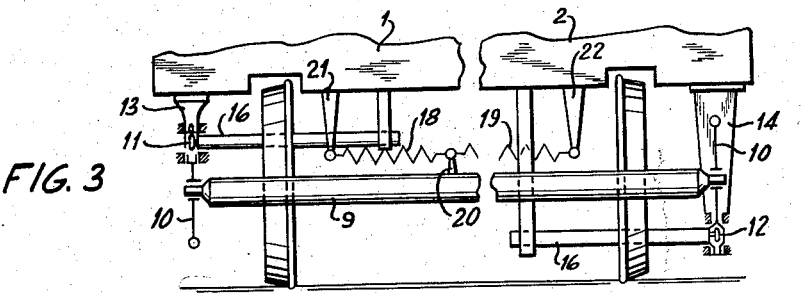
Fig. 3 shows a front view of a car with the frame of the carriage with single axle.

Referring now more particularly to the drawing, there are schematically disclosed two cars 1, 2 (partly shown) coupled together in known manner through an intermediate tension coupling 3, pendulum strut means 4 being provided for balancing purposes and being held between supports 7, 8 extending from cars 1, 2 by means of ball-shaped links or universal joints 5, 6.

The two cars 1, 2 are supported on frame 9 of a single axle carriage. This support is changed according to the invention into the linkage system which maintains the single axle always oriented in the direction of the angular bisector of the angle included between the longitudinal axes of the two cars. This linkage system comprises on each side of the axle frame 9 a double lever 10 swingable about the geometric axis of the wheel axle or about an axis parallel to said geometric axis. The ends of each lever 10 are connected by means of link rods 11, 12 to brackets 13, 14 mounted on the two cars 1, 2. In order to employ this linkage system as a resilient support for taking up the load of the two cars 1, 2, one end of the link rods 11, 12 and in particular ends thereof connected to the cars is constructed as support links. According to Fig. 1, without interfering with lateral deviations, each link rod 11, 12 is connected firmly with a torsion spring 15, the other end of each spring being connected with brackets 13, 14, respectively. The torsion springs 15 take up the load of the two cars and eliminate the necessity for providing separate support elements between the axle frame 9 and the car bodies 1, 2.

When it is desired to employ fluid pressure means in lieu of torsion springs, as shown in Figs. 2 to 6, the resilient or spring-like coupling element is constituted by an air spring, the cylinder 16 of which is rigidly connected to the brackets 13, 14 and the shaft carrying paddles or fins is connected through the intermediary of a swing system to the links 11, 12 by means of vertical bolts 17. To air spring systems belong constructions similar to that of Fig. 6 which comprises a cylindrical housing 29 provided with radial guide walls 30, in which housing a shaft 24' is rotatably mounted which is likewise provided with radial paddle or fin surfaces 32, 33, enclosing compressed air cushion means or the like, constituting compressible means creating increased resistance between said guide walls and said paddle surfaces.

In order to minimize to a reasonable amount oscillating lateral (deviation) movements between car bodies 1, 2 and the axle frame 9 there are arranged between said car bodies and said axle frame laterally working transverse springs 18, 19, which are connected between a central abutment bracket or post 20 on the axle frame and lateral abutment brackets or posts 21, 22 of the car bodies 1, 2.

Figure 4:
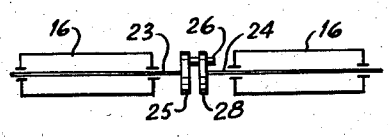
Fig. 4 shows the coupling of both torsion spring members on a carriage.
Figure 7:
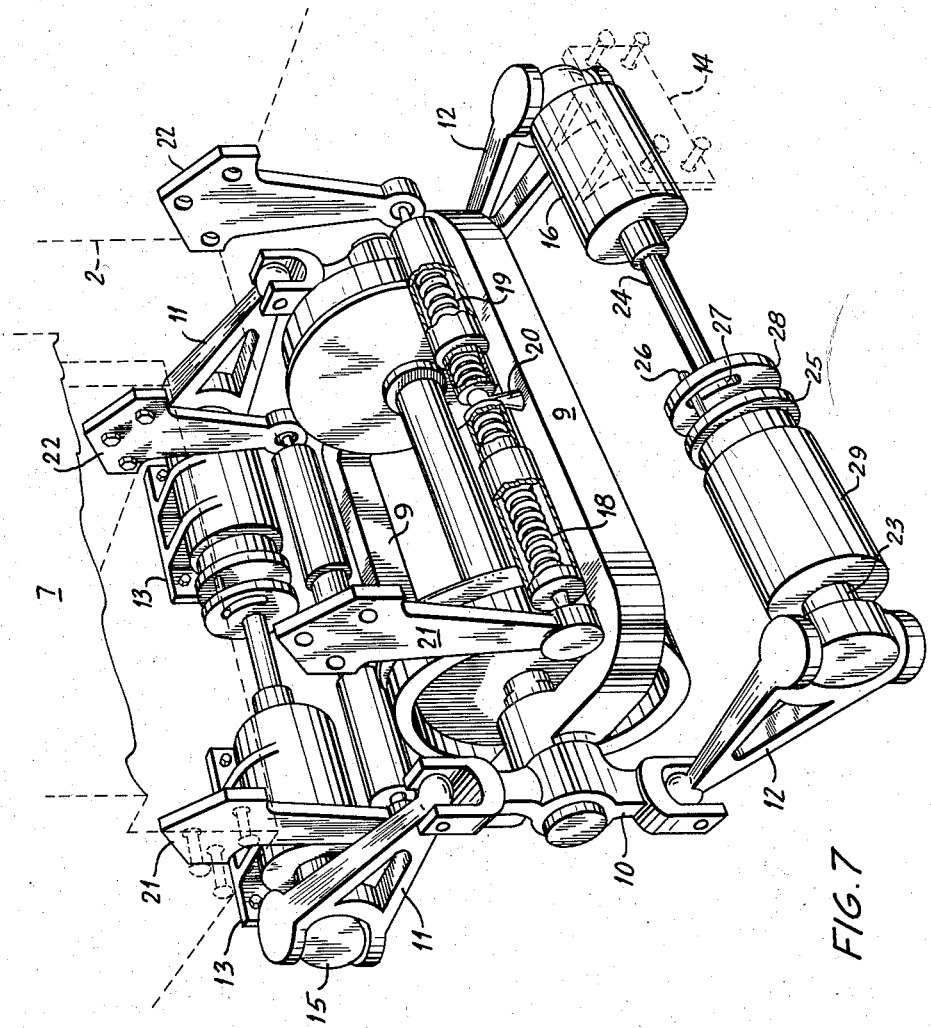
Fig. 7 is a perspective pictorial view of Fig. 3.
Figure 5:
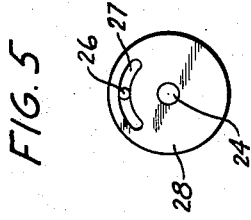
Fig. 5 shows an end view of a coupling according to Fig. 4 adapted to limit swaying motions.

To limit the swaying motion of the car bodies the rotating shafts 23, 24 of the two air spring means on each car body are connected with each other with a certain amount of play, as seen in Fig. 4. The shaft 23 of one air spring carries at one end a plate 25 provided with a crank pin 26, which fits into a curved slot 27 provided in a plate 28 on the adjacent end of the shaft 24 of the other air spring 16. The pin and slot thus may be seen to constitute a lost motion connection.

As long as no swaying motion occurs the two axles 23, 24 rotate always in the same direction so that no relative motion occurs between the pin 26 and the slot 27. The arrangement of the pin 26 in the slot 27 is such that the pin, as long as no swaying motion occurs, is disposed approximately in the middle slot 27. Upon the occurrence of swaying motions, there results a relative movement between the pin and the slot in one or the other direction, whereby this swaying motion will be limited through abutment of pin 26 against one or the other end of the slot 27.

The arcuate length of the slot 27 can be made adjustable through known means in order to limit the swaying motion to the required extent.

Figure 6:
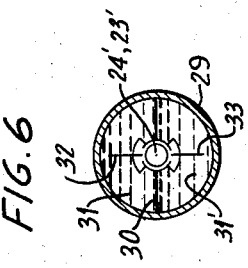
Fig. 6 shows a sectional view through a modified swaying damping device.

Instead of the above described arrangement for limiting swaying motions sway damping means according to Fig. 6 may be used. In such case the axle 23' of one of the air springs carries at the end which projects beyond cylinder 16 a cylindrical casing 29 into which the rotating axle 24' of the other air spring projects. The cylindrical casing 29 is divided by means of a wall 30 into two oil-filled chambers 31, 31'. The axle 24' carries within the cylindrical casing or housing 29 two radial paddles 32, 33 which are dimensioned so as to leave a small passageway between their outer ends and the wall of the cylindrical housing 29. In this modification the paddles and the wall constitute the lost motion connection.

The construction is such that in the neutral position the paddles 32, 33 extend perpendicular to the wall 30. Upon relative rotation between the cylindrical housing and the axle 24' the paddles 32, 33 act as damping elements or means and simultaneously as motion limiting abutments.

The above described limiting and damping means may be modified in many respects. Thus, slot 27 could be replaced by a groove or depression in which the outer end of pin 26 is guided, and paddles 32, 32 could be provided with orifices and made of a width equal to the inner radius of casing 29 in lieu of being less wide as shown in Fig. 6.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. Coupling means for resiliently connecting adjacent ends of two cars of a train to the frame of an intermediately located single-axle wheel carriage, comprising a pair of double-armed levers pivotally mounted on opposite sides of said frame, four link arms, each link arm being pivotally connected at one of its extremities to a corresponding end of one of said levers, four torsional air springs, one for each link arm, each of said air springs comprising a shaft and a cylinder, each shaft having one end pivoted to the other extremity of its respective link arm and extending substantially perpendicularly thereto in a generally horizontal plane, and each cylinder being substantially coaxial with its respective shaft and adapted to be fixedly connected to an adjacent end of one of said cars, each cylinder having a transverse wall therein dividing it into two chambers, each shaft being provided with paddle means projecting substantially radially therefrom into each of the chambers of its associated cylinder, said chambers being filled with air under pressure, each air spring being coaxial with the other air spring adapted to be connected to the same one of said cars, and lost motion means interconnecting the two air springs for each of said cars and comprising pin means on one shaft of each coaxial spring pair and slot means on the other shaft of each coaxial spring pair, said slot means receiving said pin means and including an arcuate slot of predetermined length, said lost motion means thereby permitting a limited amount of relative rotation between said shafts.

2. Coupling means for resiliently connecting adjacent ends of two cars of a train to the frame of an intermediately located single-axle wheel carriage, comprising a pair of double-armed levers pivotally mounted on opposite sides of said frame, four links, each being pivotally connected at one of its extremities to a corresponding end of one of said levers, four torsional air springs, one for each link arm, each of said air springs comprising a shaft and a cylinder, each shaft having one end pivoted to the other extremity of its respective link arm and extending substantially perpendicularly thereto in a generally horizontal plane, and each cylinder being substantially coaxial with its respective shaft and adapted to be fixedly connected to an adjacent end of one of said cars, each cylinder having a transverse wall therein dividing it into two chambers, each shaft being provided with paddle means projecting substantially radially therefrom into each of the chambers of its associated cylinder, said chambers being filled with air under pressure, each air spring being coaxial with the other air spring adapted to be connected to the same one of said cars, and lost motion means coupling the two shafts of each coaxial pair of air springs together but permitting a limited amount of relative rotation between said coupled shafts, each of said lost motion means comprising an oil-filled cylindrical casing mounted on one shaft of the respective coaxial spring pair and being provided with a transverse wall dividing it into two oil-filled, semicylindrical chambers, the other shaft of said respective coaxial spring pair extending into said casing concentrically therewith and being provided with paddle means projecting into each of said chambers.

3. In a train of at least two cars having tension coupling means and pendular strut means interconnecting the adjacent ends of said cars; means for supporting both of said adjacent car ends without having any portion of the weight of either of said cars taken up by the other, comprising a carriage including a frame, a single axle extending across said frame and transversely to the normal direction of longitudinal movement of said cars, a pair of wheels rotatably arranged at spaced locations on said axle, a pair of levers mounted intermediate their respective ends on opposite sides of said frame and arranged for pivotal movement about an axis oriented transversely to said direction of movement of said cars, each of said cars being provided adjacent said end thereof with a pair of downwardly depending brackets, a first pair of link arms pivotally connected, respectively, at one of their extremities to corresponding first ends of said levers and extending therefrom toward one of said pairs of brackets on one of said cars, a first pair of torsion means interconnecting the other extremities of said first pair of link arms, respectively, with said one pair of brackets, a second pair of link arms pivotally connected, respectively, at one of their extremities to corresponding second ends of said levers and extending therefrom toward the other pair of brackets on the other of said cars, and a second pair of torsion means interconnecting the other extremities of said second pair of link arms, respectively, with said other pair of brackets, whereby said frame takes up the weight of each car directly through the intermediary of said pairs of torsion means, said pairs of link arms and said pair of levers, the system constituted by said levers, link arms and torsion means further ensuring continual orientation of said axle along the bisector of the angle formed by the longitudinal axes of said cars.

4. In a train of at least two cars having tension coupling means and pendular strut means interconnecting the adjacent ends of said cars; means for resiliently supporting and taking up the weight of both of said cars without having any portion of the weight of either of said cars taken up by the other, comprising a carriage including a frame, a single axle extending across said frame and transversely to the normal, longitudinal direction of movement of said cars, a pair of wheels rotatably arranged at spaced locations on said axle, lever means having opposite ends and mounted intermediate said opposite ends on opposite sides of said frame and arranged for pivotal movement about an axis oriented transversely to said direction of movement of said cars, first link arm means pivotally connected at one of the extremities thereof to said lever means at one of said opposite ends of the latter and extending therefrom toward one of said cars, first resilient torsion means interconnecting said first link arm means at the other extremity thereof with said one car, second link arm means pivotally connected at one of the extremities thereof to said lever means at the other of said opposite ends of the latter and extending therefrom toward the other of said cars, and second resilient torsion means interconnecting said second link arm means at the other extremity thereof with said other car, whereby said frame takes up the weight of each car directly through the intermediary of said torsion means, said link arm means and said lever means, the system constituted by said lever means, link arm means and torsion means further ensuring continual orientation of said axle along the bisector of the angle formed by the longitudinal axes of said cars.

5. In a train of at least two cars having tension coupling means and pendular strut means interconnecting the adjacent ends of said cars; means for resiliently supporting and taking up the weight of both of said cars adjacent said ends without having the weight of either of said cars taken up by the other, comprising a single-axle wheel carriage including a frame, first linkage means, first pivot joint means interconnecting one portion of said first linkage means with said frame, a second pivot joint means interconnecting another portion of said first linkage means with one of said cars, first resilient torsion means operatively connected to one of said first and second pivot joint means for opposing pivotal displacements of said first linkage means, second linkage means, third pivot joint means interconnecting one portion of said second linkage means with said frame, fourth pivot joint means interconnecting another portion of said second linkage means with the other of said cars, and second resilient torsion means operatively connected to one of said third and fourth pivot joint means for opposing pivotal displacements of said second linkage means, whereby said frame takes up the weight of each car directly through the intermediary of said torsion means, said linkage means and said pivot joint means, the system constituted by said linkage means, pivot joint means and torsion means further ensuring continual orientation of said axle along the bisector of the angle formed by the longitudinal axes of said cars.

6. A system for coupling adjacent ends of two train car bodies to an intermediately located axle carriage having a frame, comprising a pair of levers pivotally mounted intermediate their respective ends on opposite sides of said frame and substantially coaxially with said axle, a first pair of link arms pivotally connected, respectively, at one extremity thereof to respective first ends of said levers, a second pair of link arms pivotally connected, respectively, at one extremity thereof to respective second ends of said levers, said first and second pairs of said link arms extending in opposite directions with respect to each other from said lever ends and to respective locations underneath said car bodies, and a plurality of resilient coupling means each having one portion thereof attached to the other extremity of a corresponding one of said link arms, the other portion of each of said resilient coupling means being adapted to be connected to that one of said car bodies located thereabove to establish a resilient connection between said car bodies and said axle carriage, each of said resilient coupling means comprising fluid pressure means.

7. A system according to claim 6, each fluid pressure means comprising a cylinder and a shaft extending into said cylinder, said cylinder and shaft being relatively rotatable, one of said cylinder and shaft constituting said portion connected to said corresponding one of said link arms and the other of said cylinder and shaft constituting the portion adapted to be connected to the corresponding one of said car bodies, said cylinder having wall means extending thereacross and dividing it into a plurality of chambers each of which is filled with fluid, and paddle means on said shaft internally of said cylinder, whereby upon occurrence of relative rotational movements between said cylinder and shaft the fluid trapped between said paddle means and said wall means will serve to dampen said movements.

8. A system according to claim 7, each pair of said fluid pressure means which are to cooperate with the same one of said car bodies being arranged coaxially of one another, and a lost motion connection between adjacent ends of those elements of each of said pair of fluid pressure means which have their remote ends connected to the corresponding pair of said link arms.

References Cited in the file of this patent

UNITED STATES PATENTS

| | | |
|---|---|---|
| 2,141,592 | Clar et al. | Dec. 27, 1938 |
| 2,647,470 | MacVeigh | Aug. 4, 1953 |
| 2,685,845 | Gassner et al. | Aug. 10, 1954 |
| 2,746,398 | Tomas | May 22, 1956 |
| 2,746,399 | Tomas | May 22, 1956 |